US011435256B2

(12) United States Patent
Jagannathan

(10) Patent No.: US 11,435,256 B2
(45) Date of Patent: Sep. 6, 2022

(54) METHOD AND SYSTEM FOR DETECTING AND QUANTIFYING IRREGULARITIES IN A FLUIDIC CHANNEL

(71) Applicant: HALLIBURTON ENERGY SERVICES, INC., Houston, TX (US)

(72) Inventor: Srinivasan Jagannathan, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 151 days.

(21) Appl. No.: 16/961,665

(22) PCT Filed: Feb. 7, 2018

(86) PCT No.: PCT/US2018/017207
§ 371 (c)(1),
(2) Date: Jul. 11, 2020

(87) PCT Pub. No.: WO2019/156661
PCT Pub. Date: Aug. 15, 2019

(65) Prior Publication Data
US 2020/0400528 A1    Dec. 24, 2020

(51) Int. Cl.
*G01M 3/28* (2006.01)
*G01N 29/04* (2006.01)

(52) U.S. Cl.
CPC ................. *G01M 3/2815* (2013.01)

(58) Field of Classification Search
CPC .. G01M 3/00; G01M 3/24–28; G01M 3/2815; G01N 29/00; G01N 29/04
See application file for complete search history.

(56) References Cited

U.S. PATENT DOCUMENTS

| 3,903,729 A | * | 9/1975 | Covington | .......... G01M 3/2815 |
| | | | | 73/40.5 R |
| 4,678,621 A | * | 7/1987 | Callaghan | ............... G01M 3/24 |
| | | | | 376/250 |

(Continued)

FOREIGN PATENT DOCUMENTS

| JP | S6013237 A | 1/1985 |
| JP | 2016024114 A | 2/2016 |

(Continued)

OTHER PUBLICATIONS

International Search Report and Written Opinion; PCT Application No. PCT/US2018/017207; dated Oct. 25, 2018.

(Continued)

*Primary Examiner* — Nguyen Q. Ha
(74) *Attorney, Agent, or Firm* — Polsinelli PC

(57) ABSTRACT

A method for detecting an irregularity within a fluidic channel, the method including inducing a pressure pulse within a fluidic channel, the pressure pulse resulting in a pressure fluctuation; detecting the pressure fluctuation at a predetermined location within the fluidic channel; determining a measured pressure profile based on the detected pressure fluctuation; providing a baseline pressure profile relating to a pressure within an unaltered fluidic channel; applying an algorithm to the baseline pressure profile and the measured pressure profile; and outputting an irregularity location and an irregularity effect based on the algorithm.

17 Claims, 6 Drawing Sheets

(56) References Cited

U.S. PATENT DOCUMENTS

| | | | |
|---|---|---|---|
| 5,333,501 A * | 8/1994 | Okada | G01M 3/243 73/592 |
| 5,623,421 A * | 4/1997 | Savic | G01N 29/14 73/40.5 A |
| 6,993,963 B1 | 2/2006 | Gudmundsson | |
| 7,266,992 B2 * | 9/2007 | Shamout | G01M 3/243 73/49.1 |
| 9,835,592 B2 * | 12/2017 | Yusuf | G01B 21/14 |
| 9,983,092 B2 * | 5/2018 | Howitt | G01M 3/2807 |
| 10,067,092 B2 * | 9/2018 | Burtea | E03B 9/02 |
| 10,851,947 B2 * | 12/2020 | Gong | G01M 5/0033 |
| 2002/0120411 A1 | 8/2002 | Fierro et al. | |
| 2003/0033879 A1 * | 2/2003 | Adewumi | G01N 29/40 73/627 |
| 2005/0011278 A1 | 1/2005 | Brown et al. | |
| 2012/0041694 A1 | 2/2012 | Stephens et al. | |
| 2012/0227499 A1 * | 9/2012 | Amir | G01N 29/043 73/622 |
| 2017/0089518 A1 | 3/2017 | Albertao et al. | |
| 2017/0255717 A1 | 9/2017 | Kumar et al. | |

FOREIGN PATENT DOCUMENTS

| | | | |
|---|---|---|---|
| WO | WO-2018184089 A1 * | 10/2018 | F23M 5/08 |
| WO | 2019135737 A1 | 7/2019 | |

OTHER PUBLICATIONS

English abstract of JP2016024114; retrieved from www.epacenet.com on Jul. 9, 2020.

Colombo, Andrew & Lee, Pedro & Karney, Bryan. (2009). A selective literature review of transient-based leak detection methods. Journal of Hydro-environment Research. 2. 212-227. 10.1016/j.jher.2009.02.003.

Jönsson L., Larson M. (1992) Leak Detection through Hydraulic Transient Analysis. In: Coulbeck B., Evans E.P. (eds) Pipeline Systems. Fluid Mechanics and Its Applications, vol. 7. Springer, Dordrecht.

Witness Mpesha, M. Hanif Chaudhry & Sarah L. Gassman (2002) Leak detection in pipes by frequency response method using a step excitation, Journal of Hydraulic Research, 40:1, 55-62.

J. P. Vitkovsky et al., "Optimal measurement site locations for inverse transient analysis in pipe networks," Journal of water resources planning and management, ASCE 129(6), 480-491.

J. A. Liggett and L. -C. Chen, "Inverse transient analysis in pipe networks," Journal of Hydraulic Engineering 120(8) 1994: 934-955.

L. Jonsson, "Experimental studies of Leak Detection using Hydraulic Transients," In: 29" IAHR Congress Proceedings, IAHR, Sep. 16-21, 2001, Beijing China.

B. Brunone and M. Ferrante, "Detecting Leaks in pressurized pipes by means of transients," Journal of Hydraulic Research, IAHR, 39(5) 539-547.

R. S. Pudar and J. A. Liggett, "Leaks in Pipe Networks," Journal of Hydraulic Engineering, 118(7) (1992): 1031-1046.

J.P. Vitkovsky, A. R. Simpson, M. F. Lambert, "Minimization algorithms and experimental inverse transient leak detection," EWRI, Roanoke VA, 2002.

B. Brunone, "Transient test-based technique for leak detection in outfall pipes," Journal of water resources planning and management ASCE 125(5), 302-306.

European Search Report, Application No. 18904670.9, dated Dec. 1, 2021.Jan. 12, 2021.

English Abstract of JPS6013237; Retrieved from www.espacenet.com on Jan. 13, 2021.

* cited by examiner

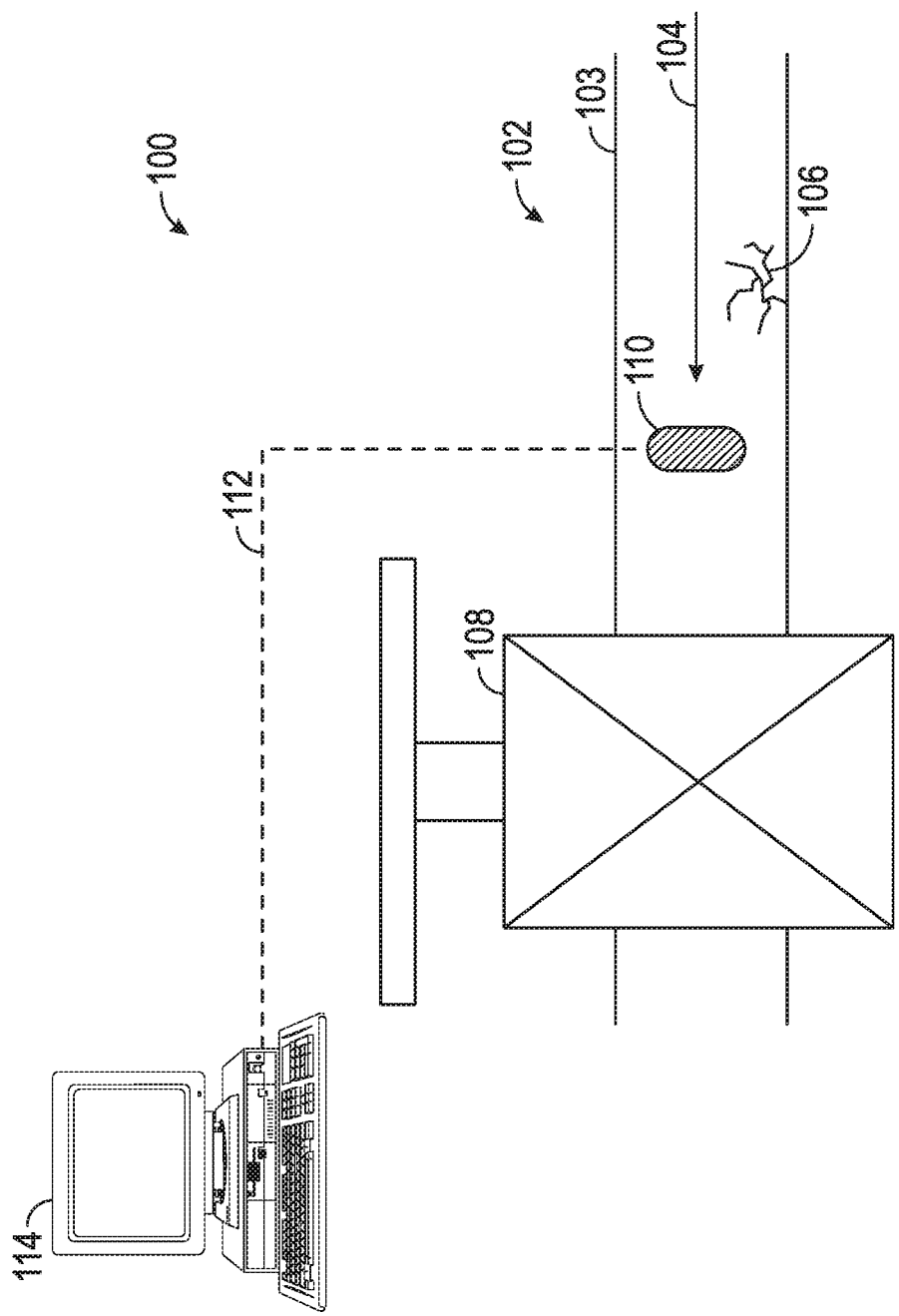

METHOD AND SYSTEM FOR DETECTING AND QUANTIFYING IRREGULARITIES IN A FLUIDIC CHANNEL

CROSS-REFERENCE TO RELATED APPLICATIONS

This application is a national stage entry of PCT/US2018/017207 filed Feb. 7, 2018, said application is expressly incorporated herein by reference in its entirety.

FIELD

The present disclosure relates generally to the detection and quantification of irregularities within a fluidic channel, such as a pipeline. In particular, the present disclosure relates to remote methods for the estimation of the location of irregularities, and the effects such irregularities can produce within a fluidic channel.

BACKGROUND

Wellbores are drilled into the earth for a variety of purposes including tapping into hydrocarbon bearing formations to extract the hydrocarbons for use as fuel, lubricants, chemical production, and other purposes. Fluidic channels, such as pipelines, are used for a variety of purposes including the transportation of large amounts of fluids from production areas to storage and distribution locations. These fluidic channels need to be thoroughly inspected in order to evaluate the integrity of the channel and to ensure there are no irregularities such as leaks, blockages by deposits, structural erosion or damage, and illegal taps.

Most methods for monitoring the integrity of fluidic channels are intrusive, such as using pigs, overhead drones, low flying airplanes, and the like. These methods can entail considerable investments in both time and money.

BRIEF DESCRIPTION OF THE DRAWINGS

Implementations of the present technology will now be described, by way of example only, with reference to the attached figures, wherein:

FIG. 1 is a schematic diagram of an exemplary environment for a system for modeling irregularities in a fluidic channel according to the present disclosure;

DETAILED DESCRIPTION

Figure 2A:
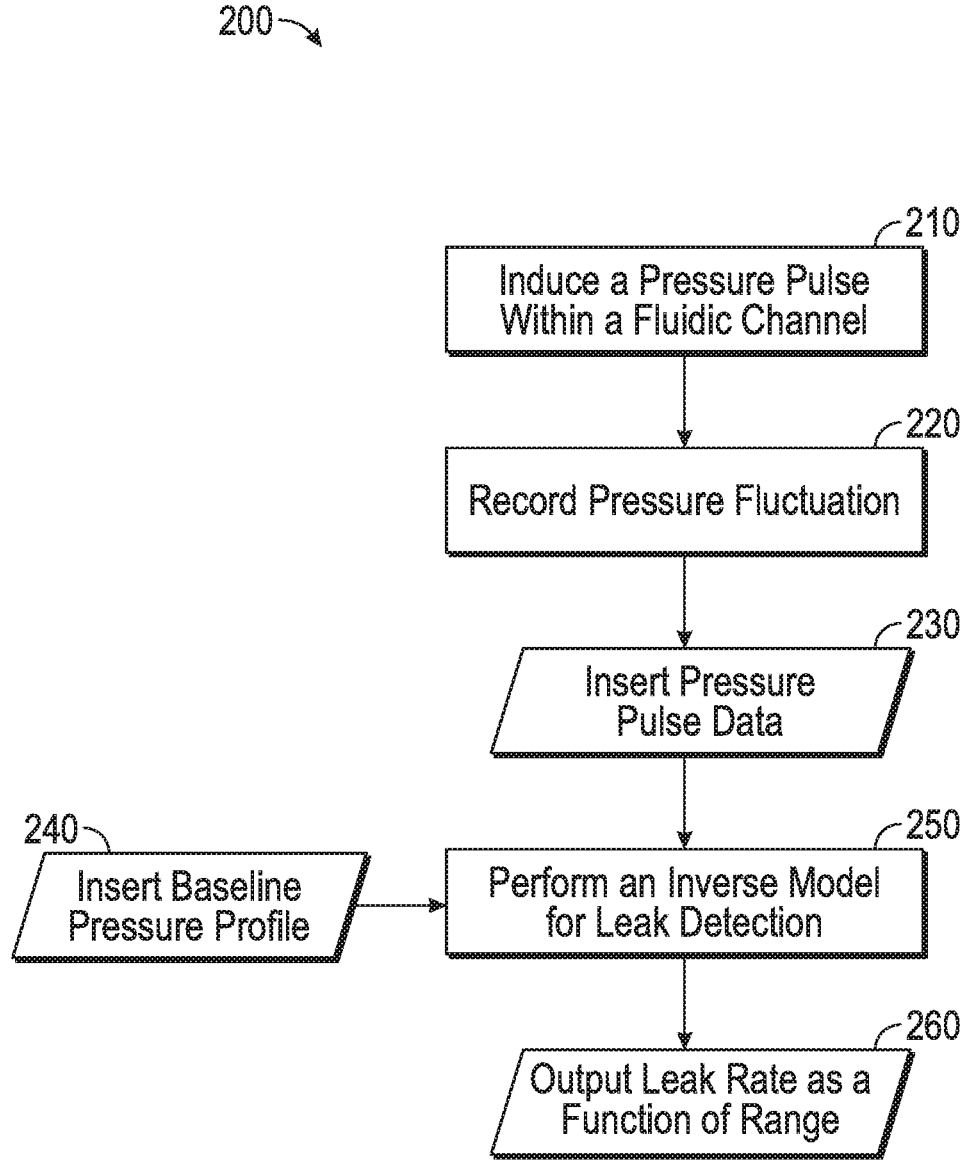
FIG. 2A is a flow chart of a method for generating a model indicating leaks within a fluidic channel.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein are systems and methods for remotely and non-invasively monitoring fluidic channels to detect and quantify irregularities. In one or more example embodiments, a measured pressure profile is obtained using a pressure pulse to iteratively improve determination of the location of an irregularity within a fluid channel. An error can be determined between a baseline pressure profile and a measured pressure profile, when the error is within a predefined threshold, irregularity data is output identifying the effect and location of the irregularity within the fluidic channel.

In order to obtain a measured pressure profile, pressure pulses are induced within the fluidic channel. One or more sensors can be used to measure a pressure profile based on the pressure pulse(s) reflecting off of irregularities within the fluidic channel. The measured pressure profile may be then forwarded to a computing device, such as a data acquisition system, a processing unit, or the like.

The computing device then applies a mathematical algorithm to the baseline pressure profile and the measured pressure profile. Algorithms which can be used in the disclosed methods and systems can include, but are not limited to, inverse models. The baseline pressure profile is provided as an input to the computing device representing the pressure profile that should be found in an undamaged fluidic channel. The algorithm can include inputting estimated irregularity data, such as a location or effect, as well as data relating to the pressure pulse created, and performing a mathematical model of the data. Mathematical models which can be used in the disclosed methods and systems can include, but are not limited to, forward models. Based on the mathematical model, an error can be calculated. A threshold can be set to allow for a predetermined acceptable error within the final calculation. If the error is not within the predetermined threshold, in other words, when the error is greater than the predetermined threshold, the estimated irregularity data can be adjusted to narrow the difference between the error and the threshold, and the mathematical model can be repeated. Once the estimated irregularity data is updated, the mathematical model is used to recalculate an updated error. If the error is again greater than the predetermined threshold, the aforementioned steps are repeated until an error within the predetermined threshold is obtained. The irregularity data can be updated at any point based on the error at that point in space and time, as well as potential error values at a point of time in the future. Once an error within the threshold is obtained, a model can be performed to evaluate the irregularity within the fluidic channel.

The above described method can be employed in an exemplary system 100 shown, for example, in FIG. 1. FIG. 1 is a schematic diagram illustrating an exemplary environment 100 for a system of modeling irregularities within a fluidic channel 102. In at least one example, the fluidic channel 102 can be a pipeline. In an alternative example, the fluidic channel 102 can be, but is not limited to, a wellbore, a drill string, or any channel which can be used to transport fluids. The fluidic channel 102 may have any orientation, or can extend one or more directions, such as vertically, at an angle, or along any axis, and may be, but is not required to be, horizontal as schematically depicted in FIG. 1. The fluidic channel 102 can have walls 103 which form an annulus 104 through which fluid can flow. The fluid, as described herein, can be either a liquid or a gas and can include one fluid or multiple different fluids. In at least one example, the fluid is a liquid such as water or oil. In at least one example, the fluid can substantially fill the fluidic channel 102. In an alternative example, the fluid can partially fill the fluidic channel 102. The walls 103 of the fluidic channel 102 can form a cross-sectional shape such as substantially circular, ovoid, rectangular, or any other suitable shape. The walls 103 of the fluidic channel 102 can be made of any combination of plastics, metals, or composites suitable to withstand fluid flow without corrosion and with minimal deformation.

Within the fluidic channel 102 irregularities 106 can occur. Such irregularities can cause a change in pressure within the pipe, for example, a pressure decrease or a pressure increase. Irregularities causing a pressure change or fluctuation within the fluidic channel can include, but are not limited to leaks, corrosion of the fluidic channel, illegal taps into the fluidic channel, an obstruction within the pipe (e.g., pipeline deposits, foreign objects), gas-liquid pooling, and changes in diameter of the channel (e.g., from corrosion or other damage). Such irregularities 106 can cause flow irregularities, including but not limited to leaks, flow restrictions, turbulent flow, pressure decrease, and pressure increase within the fluidic channel. Such irregularities 106 can affect the flow through the fluidic channel 102 in a variety of ways need to be located and evaluated. In at least one non-limiting example, a pressure decrease can indicate a leak. The methods described herein can be used to determine factors such as the location and rate of the leak as well as to detect various other anomalies or irregularities within a pipe.

In order to obtain a measured pressure profile within the fluidic channel 102 and inspect the irregularity 106 in a non-intrusive manner, one or more pressure pulses can be induced within the fluidic channel 102. In at least one example, the pressure pulse can be a water-hammer pulse. As used herein, the term "water-hammer" refers to a pressure surge or wave caused when a fluid in motion is forced to stop or change direction suddenly. A device 108, such as a valve, can be used to create the pressure pulse by temporarily blocking the flow of fluid in a fluid channel. The device 108 can create a pulse which can travel through the fluidic channel 102 at the local speed of sound within the medium. In at least one example, the device 108 is a permanent fixture. In an alternative example, the device 108 is a removable fixture, such as an attachment. As such, the device 108 can be disposed completely within the fluidic channel 102, or coupled with the fluidic channel 102 temporarily in order to create pressure pulses for testing. In at least one example, the device 108 is a valve which can be closed in order to create a water-hammer effect within the fluidic channel 102. In such example, when the valve is closed, the fluid is forced to suddenly change direction, generating a pressure pulse which travels upstream through the fluidic channel upstream and away from the valve. The device 108 can be either mechanically driven or electrically programmed, such that different pressures can be induced based on the desired pulse or pulse sequence. Specifically, the device 108 can be programmed to perform open and close sequences. Such sequences can increase the accuracy of the irregularity analysis by providing a more detailed pulse response. For example, the speed at which the valve is opened and closed, the greater, or sharper, the resulting pressure pulse will become, which will create a more accurate measured pressure profile.

As the pressure pulse travels along the fluidic channel 102, any irregularities 106 encountered will generate a signal, such as a change in pressure, which can be reflected back towards the device 108. A sensor 110 can be placed at a predetermined location within the fluidic channel 102 and is configured to receive such signals. The sensor can be any device operable to detect a change in pressure. In at least one example, the sensor 110 can be a pressure transducer. In an alternative example, the sensor 110 can be any suitable sensor capable of measuring pressure or stress of the fluid, for example a string gauge, an optical fiber transducer, and the like. The reflected signals can then be passed through a transmission system 112 to a computing device 114 to be interpreted such that the computing device 114 can map out and quantify the irregularities 106 found within the fluidic channel 102. The computing device 114 can be at the surface, within a vehicle such as a submarine, or any other suitable location such that the data can be interpreted by an operator. The computing device 114 can include a non-transitory computer readable storage medium having at least one processor and storing instructions thereon which are executable by the at least one processor. The transmission system 112 can be, but is not limited to, wireline, optical fiber, wireless (such as through the cloud or Bluetooth), or any other suitable method to transmit data.

Figure 2B:
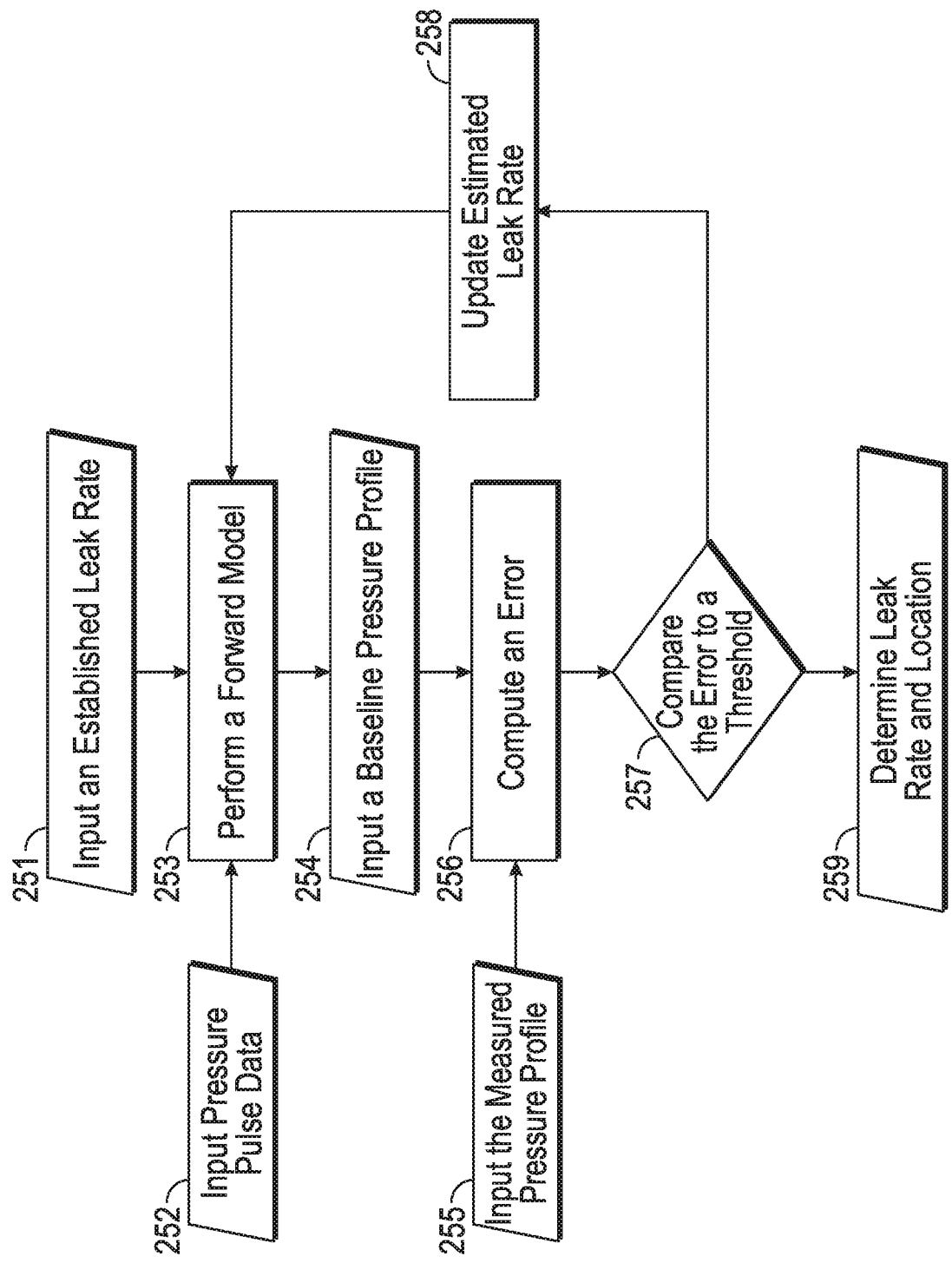
FIG. 2B is a detailed flow chart of the inversion scheme of FIG. 2A.

FIG. 2A is a flowchart in accordance with an example embodiment illustrating a method 200 for detecting an irregularity within a fluid channel. Method 200 is provided by way of example only; various other ways to carry out the method are possible without departing from the scope of the disclosure. The method 200 can be carried out using the configurations illustrated in FIG. 1, for example, and various elements of these figures are referenced in explaining example method 200. FIG. 2B is a flow chart of the inversion scheme of FIG. 2A. Each block shown in FIGS. 2A and 2B represent one or more processes, methods or subroutines, carried out in the method. Furthermore, the illustrated order of blocks is illustrative only, and the order of the blocks can change without departing from the scope of the disclosure. Furthermore, additional blocks may be added or fewer blocks may be utilized, without departing from the scope of this disclosure. For the purposes of this example, the irregularity the method 200 is used to detect is a leak, the method 200 is used to determine both leak rate and leak location. Method 200 can begin at block 210.

Referring first to FIG. 2A, a method 200 for generating a model indicating the presence of one or more leaks within a fluidic channel is shown. At block 210, a pressure pulse is induced within a fluidic channel, as described above with respect to FIG. 1. The pulse can include a single pulse, or a series of pulses to increase the accuracy of the resulting model. For example, a sequence of pulses having the same or differing speed/sharpness can be created. The pressure pulse can be induced by a device capable of stopping fluid flow within the channel. For the purposes of this example, the device is a valve, such as a quick-closing valve. By opening and closing the quick-close valve, a water-hammer effect is produced inducing a pressure pulse within the fluidic channel. Accordingly, the time it takes for the valve to close can drastically affect the resulting pulse. For example, the faster the valve is closed, the sharper the pressure pulse created will be. The sharper the valve is closed, the less noise will be present in the resulting reflection. However, the speed at which the valve is closed and opened must be carefully calculated to ensure that the pressure inside the pipe will not increase to a point higher than the pipe is rated for. Thus, for fluidic channels containing a liquid, the valve closure time can range from about 0.5 seconds to about 1 second. In a fluidic channel containing a gas, the valve closure time can range from about 3 seconds to about 4 seconds. The pulse will travel upstream within the fluidic channel, away from the valve and will reflect off of any irregularity it encounters, such as leaks. The transmission can be either wired or wireless.

At block 220, the pressure fluctuations are recorded by one or more sensors located within the fluidic channel. The pressure fluctuation data is then transmitted to a computing device for interpretation of the data. Such interpretation can include the use of multiple algorithms to determine leak location and leak rates.

At block 230, pressure pulse data relating to the sequence of the pressure pulse is input to the computing device. The pressure pulse data can include information such as the speed at which the valve was closed, the number of times the valve was closed, and any change in the speed throughout the closure sequence. At block 240, a baseline pressure profile is input into the computing device. At block 250, a modeling algorithm, such as an inverse model, is performed on the data via the computing device. For example, the inverse model can produce a mathematical model which can assist in the detection of irregularities throughout the fluidic channel.

Referring now to FIG. 2B, the figure illustrates a detailed flow chart of the mathematical process described in block 250 of FIG. 2A. The detailed method of the inverse model described in block 250 begins at block 251. At block 251, an estimated leak rate, as a function of distance from a particular point, is entered into the computing device. At block 252, the pressure pulse data as described above is input into a mathematical formulation. At block 253, a forward model is performed based on all the input data.

The irregularity effect estimation algorithm is essential in performing the forward model. The model produced can represent the propagation of the pressure pulse along the fluidic channel, both upstream and downstream of the device, including reflections occurring from irregularities throughout the channel. In at least one example, the forward model step can be performed using the below equations. For the purposes of illustration, the equations are described as solving for a leak location and leak rate; however the following equations can be used to determine an irregularity within the fluidic channel, as described herein.

The pressure pulse, or water-hammer effect, created within the fluidic channel can be evaluated using Equation 1, below.

$$\frac{dQ}{dt} \pm \frac{gA}{c}\frac{dH}{dt} + RQ|Q| = 0 \quad (1)$$

Wherein the ±represents whether the waves are traveling in the positive or negative direction (i.e., upstream or downstream of the device). In a finite grid of points having a spatial resolution of $\Delta x$ and a temporal resolution of $\Delta t$ (where $\Delta x/\Delta t = c$, c representing the speed of sound within the fluidic channel). Therefore, the equations can be rewritten as shown below, for any spatial grid point p.

$$Q_p + \frac{gA}{c}H_p = Q_l + \frac{gA}{c}H_l - RQ_l|Q_l|\Delta t \quad (2)$$

$$Q_p - \frac{gA}{c}H_p = Q_r - \frac{gA}{c}H_r - RQ_r|Q_r|\Delta t \quad (3)$$

Wherein:
l,r represent the points left and right of p
Q represents the volume rate
g represents the acceleration due to gravity
A represents the cross-sectional area
c represents the speed of sound
H represents the pressure head
R represents the resistance factor for the fluid channel
Wherein Equation 2 is used to illustrate a wave traveling in the positive direction, and Equation 3 is used to illustrate a wave traveling in the negative direction.

Figure 3:
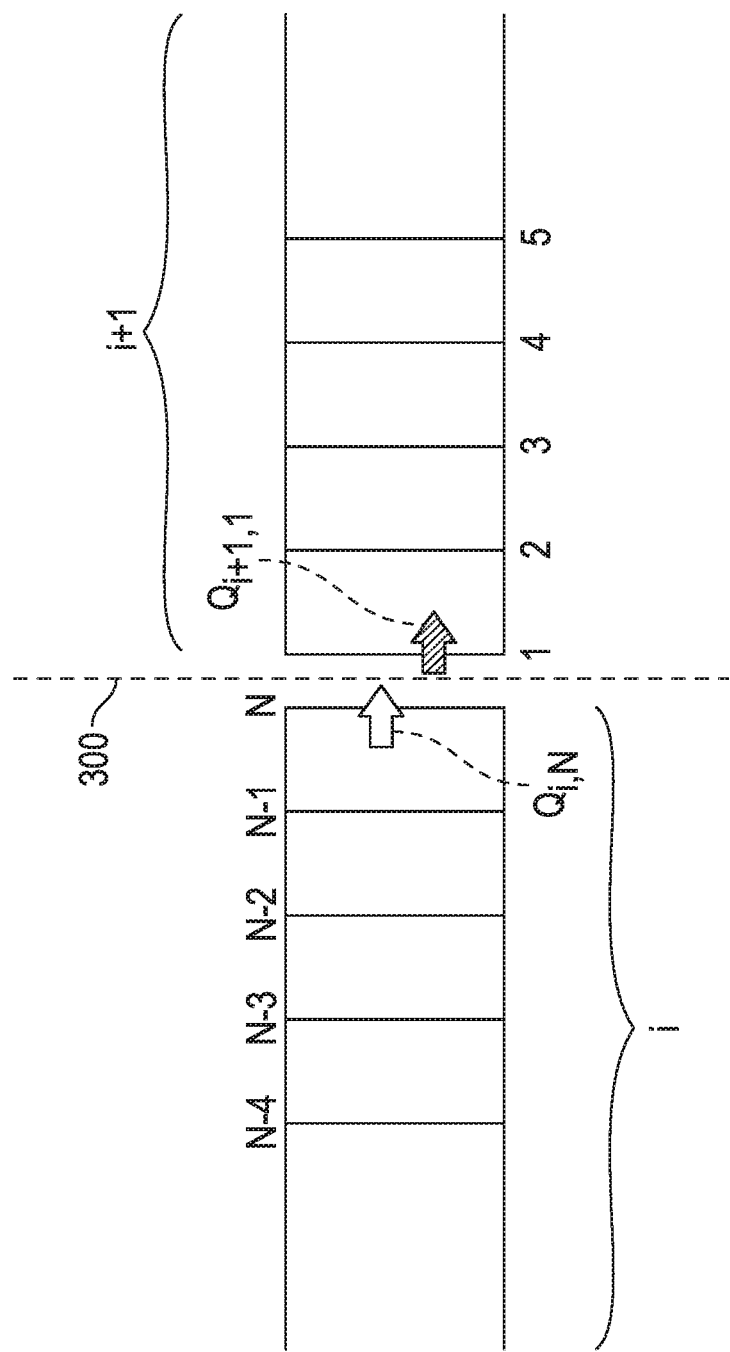
FIG. 3 is a schematic diagram of a division of fluidic channel sections.

Simulated events are run through the forward model process in order to determine how certain irregularities will affect pressure pulses within the fluidic channel. For the purposes of these simulations, the entire length of the fluidic channel is divided into several sections (S), with the boundary of each section representing a potential leak point. Additionally, each section is further divided into grid points (N). In at least one example, when the fluid is a liquid the length of fluidic channel can be up to about 1000 kilometers. In an alternative example, when the fluid is a gas the length of fluidic channel can be up to about 100 kilometers. An example of how the fluidic channel can be divided is shown in FIG. 3. In FIG. 3, $Q_{i+1,1}$ represents the flow rate at section i+1, node 1; $Q_{i,N}$ represents the flow rate at section i, node N; and the junction 300 between sections i and i+1 represent a possible leak location.

The quantity of the leak at the junction between sections i and i+1 can be obtained using an orifice formula $Q_{leak} = C_{D,i}A_i\sqrt{2gH_{i,N}}$. Such that $Q_{i,N}$ can be defined as shown in Equation 4, below.

$$Q_{i,N} = Q_{i+1,1} + Q_{leak} \quad (4)$$

Equation 4 can be combined with Equation 3, above, in order to reach Equation 5.

$$Q_{i+1,1} = C_n\bigg|i+1 + \frac{gA}{c}\bigg|_{i+1} H_{i+1,1} \quad (5)$$

Additionally, the fluid head (H) is also continuous across this junction, therefore Equation 6, below, can be used.

$$H_{i+1,1} = H_{i,N} \quad (6)$$

The above equations can be combined to arrive at Equation 7.

$$Q_{i,N} - C_{D,i}A_i\sqrt{2gH_{i,N}} = C_n\bigg|i+1 + \frac{gA}{c}\bigg|_{i+1} H_{i,N} \quad (7)$$

From Equation 2, Equation 8 can be obtained.

$$Q_{i,N} = c_p\bigg|i - \frac{gA}{c}\bigg|_i H_{i,N} \quad (8)$$

Based on Equations 7 and 8, $H_{i,N}$ can be solved for.

Figure 4:
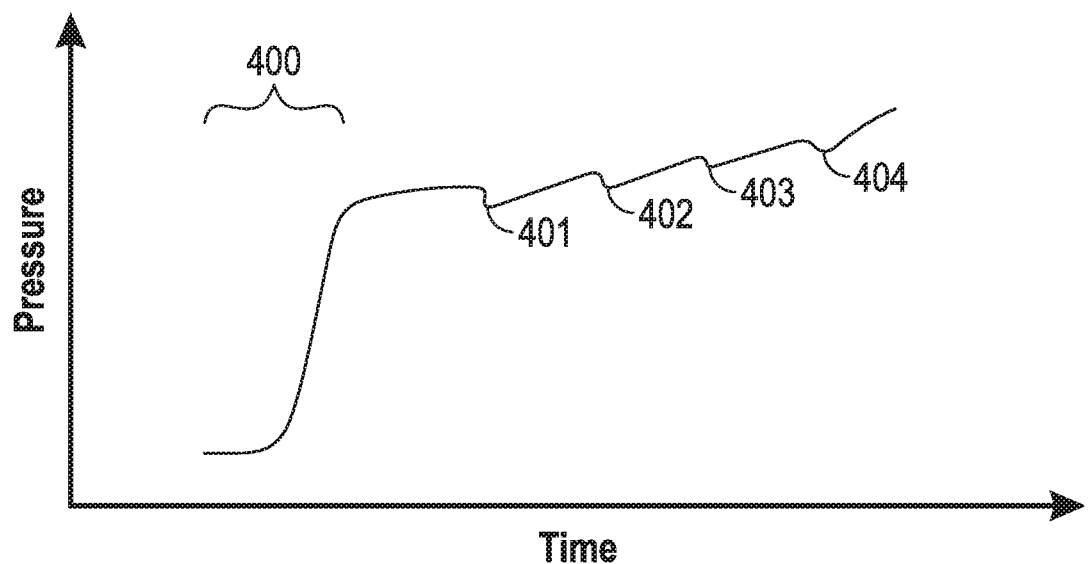
FIG. 4 is an exemplary pressure vs. time plot indicating the presence of irregularities within a fluidic channel.
Figure 5:
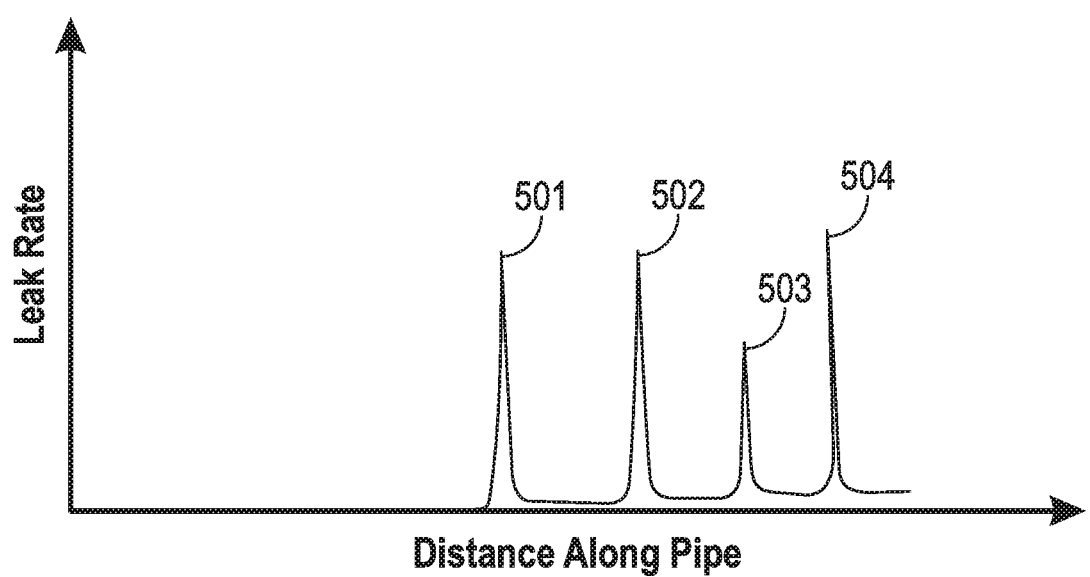
FIG. 5 is an exemplary plot indicating the effects of the irregularities of FIG. 4 as a function of distance within the fluidic channel.

Locating the irregularity can be achieved by solving Equations 2 and 3, having a boundary condition given by solving Equations 7 and 8, and finally computed via Equations 4, 5, and 6. The resulting model provides a leak location as a function of time (wherein time can be equated to range). An example of which is shown in FIG. 4, illustrating the pressures within the fluidic channel throughout a specific duration. The example illustrated in FIG. 4, provides a valve closure time 400 and the resulting pressure drops 401, 402, 403, 404. Specifically, four leaks are detected within the example fluidic channel, as illustrated by pressure drops 401, 402, 403, 404. It can be determined that the leaks 401, 402, 403, 404 are at different locations throughout the pipe by the length of time elapsed between each pressure drop. Furthermore, as shown in FIG. 5, the data can be processed in order to determine the effect of the irregularity (e.g., leak rate) as a function of distance along the fluidic channel from a predetermined point (e.g., range from the device). The leak points are now indicated as peaks 501, 502, 503, 504.

Figure 6:
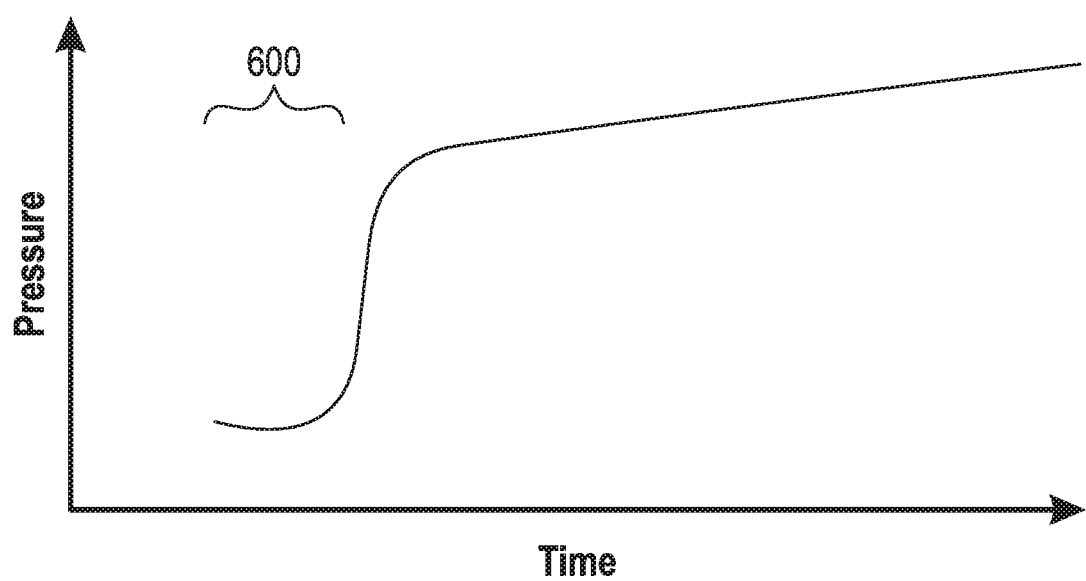
FIG. 6 is an exemplary diagram of a baseline pressure profile within an unaltered fluidic channel.

Referring back to FIG. 2B, at block 254, a baseline pressure profile is entered into the computing device. The baseline pressure profile represents the response to the water-hammer effect when no irregularities are present within the fluidic channel (i.e. an unaltered fluidic channel). An example of a baseline profile is shown in FIG. 6. FIG. 6 illustrates an example baseline pressure profile recorded in a fluidic channel without any irregularities (such as leaks or blockages) after valve closure period 600.

At block 255, the measured pressure profile is input into the computing device.

At block 256, an error between the baseline pressure profile and the measured pressure profile is determined. The error can be computed using the following equation: error=$|measured-simulated|^2$. At block 257, the calculated error is then compared to a predetermined threshold. The threshold can be set as described in detail above, and can be adjusted based on the desired intensity of the response.

If the error is less than the threshold, then the estimated leak rate is confirmed. At block 259, a leak rate and location is determined.

In the alternative, if the error is greater than the threshold, the estimated leak rate input into the computing device is inaccurate and the method circles back to block 258. At block 258, the estimated leak rate put into the method is updated and the process repeats itself starting from the forward model (block 253). In at least some examples, multiple errors can be calculated for a region proximate to the irregularity location. The irregularity effect can be computed using the summation of the errors determined within a region around the location of the irregularity, corresponding to the impulse response of the system. For example, one or more errors determined based on the pressure profile created by the pressure pulse for a defined location can be used in the calculations.

Referring back to FIG. 2A, at block 260, the leak rate is output as a function of range. Specifically, the leak location can be determined based on the distance of the leak from the device.

After the irregularity data is determined and output, the irregularity can be located and cured. Curing the irregularity can occur in one or more ways including, but not limited to, replacing the fluidic channel, cleaning the fluidic channel, plugging the fluidic channel, re-sealing the fluidic channel, and any other suitable action which would remove the effects of the irregularity.

Numerous examples are provided herein to enhance understanding of the present disclosure. A specific set of statements are provided as follows.

Statement 1: A method for detecting an irregularity within a fluidic channel, the method comprising inducing a pressure pulse within a fluidic channel, the pressure pulse resulting in a pressure fluctuation; detecting the pressure fluctuation within the fluidic channel; determining a measured pressure profile based on the detected pressure fluctuation; providing a baseline pressure profile relating to a pressure within an unaltered fluidic channel; applying an algorithm to the baseline pressure profile and the measured pressure profile; and outputting an irregularity location and an irregularity effect based on the algorithm.

Statement 2: A method according to Statement 1, wherein inducing the pressure pulse further comprises blocking the flow of a fluid through the fluidic channel.

Statement 3: A method according to Statement 1 or Statement 2, wherein the pressure pulse is created by a device.

Statement 4: A method according to Statements 1-3, wherein the device is a valve.

Statement 5: A method according to Statements 1-4, wherein the valve is a quick-close valve.

Statement 6: A method according to Statements 1-5, wherein the irregularity is selected from an obstruction, liquid pooling, changes in internal diameter of the fluidic channel, and leaks within the fluidic channel.

Statement 7: A method according to Statements 1-6, wherein the irregularity effect is selected from a pressure increase and a pressure decrease.

Statement 8: A method according to Statements 1-7, wherein detecting the pressure fluctuation further comprises recording the pressure fluctuation using a sensor.

Statement 9: A method according to Statements 1-8, further comprising transmitting the pressure fluctuation from the sensor to a computing device.

Statement 10: A method according to Statements 1-9, wherein the algorithm is an inverse model.

Statement 11: A method according to Statements 1-10, wherein applying the inverse model further comprises inputting an estimated irregularity effect and data relating to the pressure pulse; applying a mathematical model to the estimated irregularity effect and data relating to the pressure pulse; and generating an error based on the mathematical model.

Statement 12: A method according to Statements 1-11, further comprising comparing the error to a predetermined threshold; updating the estimated irregularity effect in response to the error being greater than the predetermined threshold; and repeating the mathematical model and comparison steps until the error is less than the predetermined threshold.

Statement 13: A method according to Statements 1-12, further comprising comparing the error to a predetermined threshold; generating the irregularity location in response to the error being less than a predetermined threshold; and computing the irregularity effect based on the error within a region approximate to the irregularity location.

Statement 14: A method according to Statements 1-13, wherein the mathematical model is a forward model.

Statement 15: A system comprising a length of fluidic channel having a fluid disposed therein; a device coupled with the length of fluidic channel; a sensor disposed within the length of fluidic channel and located at a predetermined distance from the device; and a non-transitory computer readable storage medium including at least one processor and communicatively coupled with each of the sensor and the device, the non-transitory computer readable storage medium storing instructions thereof executable by the at least one processor to induce a pressure pulse within the fluidic channel via activation of the device, the pressure pulse resulting in a pressure fluctuation, detect, at the sensor, the pressure fluctuation within the fluidic channel, receive, at the processor, data relating to pressure fluctuation, determine a measured pressure profile using the data relating to the pressure fluctuation, receive, at the processor, an input baseline pressure profile relating pressure within an unaltered fluidic channel, apply an algorithm to the baseline pressure profile and the measured pressure profile, and output an irregularity location and an irregularity effect based on the algorithm.

Statement 16: A system according to Statement 15, wherein the device creates the pressure pulse by blocking the flow of the fluid through the fluidic channel.

Statement 17: A system according to Statement 15 or Statement 16, wherein the device is a valve.

Statement 18: A system according to Statements 15-17, wherein the valve is a quick-close valve.

Statement 19: A system according to Statements 15-18, wherein the irregularity is selected from an obstruction, liquid pooling, changes in internal diameter of the fluidic channel, and leaks within the fluidic channel.

Statement 20: A system according to Statements 15-19, wherein the irregularity effect is selected from the group consisting of a pressure increase and a pressure decrease.

Statement 21: A system according to Statements 15-20, wherein the instructions further cause the processor to transmit the pressure fluctuation from the sensor to a computing device.

Statement 22: A system according to Statements 15-21, wherein the algorithm is an inverse model.

Statement 23: A system according to Statements 15-22, wherein the instructions further cause the processor to receive, at the processor, an estimated irregularity effect and data relating to the pressure pulse; apply a mathematical model to the input data; and determine an error based on the mathematical model.

Statement 24: A system according to Statements 15-23, wherein the instructions further cause the processor to compare the error to a predetermined threshold; update the estimated irregularity effect in response to the error being greater than the predetermined threshold; and repeat the mathematical model and comparison steps until the error is less than the predetermined threshold.

Statement 25: A system according to Statements 15-24, wherein the instructions further cause the processor to compare the error to a predetermined threshold; determine the irregularity location in response the error being less than the predetermined threshold; and computing the irregularity effect based on the error within a region approximate to the irregularity location.

Statement 26: A system according to Statements 15-25, wherein the mathematical model is a forward model.

Statement 27: A non-transitory computer-readable storage medium comprising at least one processor and having instructions stored thereon which, when executed by at least one processor, cause the at least one processor to actuate a device to induce a pressure pulse within a fluidic channel, the pressure pulse resulting in a pressure fluctuation; detect the pressure fluctuation within the fluidic channel at a sensor, the sensor being located at a predetermined distance from the device; transmit the recorded pressure fluctuation from the sensor to at least one processor, the at least one processor communicatively coupled with each of the device and the sensor; determine a measured pressure profile using the pressure fluctuation data; receive a baseline pressure profile relating to pressure within an unaltered fluidic channel; apply an algorithm to the baseline pressure profile and the measured pressure profile; and output an irregularity location and an irregularity effect based on the algorithm.

Statement 28: A non-transitory computer readable storage medium according to Statement 27, wherein the device creates the pressure pulse by blocking the flow of the fluid through the fluidic channel.

Statement 29: A non-transitory computer readable storage medium according to Statement 27 or Statement 28, wherein the device is a valve.

Statement 30: A non-transitory computer readable storage medium according to Statements 27-29, wherein the valve is a quick-close valve.

Statement 31: A non-transitory computer readable storage medium according to Statements 27-30, wherein the irregularity is selected from an obstruction, liquid pooling, changes in internal diameter of the fluidic channel, and leaks within the fluidic channel.

Statement 32: A non-transitory computer readable storage medium according to Statements 27-31, wherein the irregularity effect is selected from the group consisting of a pressure increase and a pressure decrease.

Statement 33: A non-transitory computer readable storage medium according to Statements 27-32, wherein the instructions further cause the processor to transmit the pressure fluctuation from the sensor to a computing device.

Statement 34: A non-transitory computer readable storage medium according to Statements 27-33, wherein the algorithm is an inverse model.

Statement 35: A non-transitory computer readable storage medium according to Statements 27-34, wherein the instructions further cause the processor to receive an estimated irregularity effect and data relating to the pressure pulse; apply a mathematical model to the input data; and determine an error based on the mathematical model.

Statement 36: A non-transitory computer readable storage medium according to Statements 37-35, wherein the instructions further cause the processor to compare the error to a predetermined threshold; update the estimated irregularity effect if the error is greater than the predetermined threshold; and repeat the mathematical model and comparison steps until the error is less than the predetermined threshold.

Statement 37: A non-transitory computer readable storage medium according to Statements 27-36, wherein the instructions further cause the processor to compare the error to a predetermined threshold; generate the irregularity location if the error is less than the predetermined threshold; and computing the irregularity effect based on the error within a region approximate to the irregularity location.

Statement 38: A non-transitory computer readable storage medium according to Statements 27-37, wherein the mathematical model is a forward model.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A method for detecting an irregularity within a fluidic channel, the method comprising:
   inducing a pressure pulse within a fluidic channel, a pressure fluctuation resulting from the pressure pulse;
   detecting the pressure fluctuation within the fluidic channel;
   determining a measured pressure profile based on the detected pressure fluctuation;
   providing a baseline pressure profile relating to a pressure within an unaltered fluidic channel;
   applying an algorithm to the baseline pressure profile and the measured pressure profile;
   wherein applying the algorithm further comprises:
      inputting an estimated irregularity effect and data relating to the pressure pulse;
      applying a mathematical model to the estimated irregularity effect and data relating to the pressure pulse;
      generating an error based on the mathematical model; and
      outputting an irregularity location and an irregularity effect based on the algorithm.

2. The method of claim 1, wherein inducing the pressure pulse further comprises blocking the flow of a fluid through the fluidic channel.

3. The method of claim 1, wherein the irregularity is selected from the group consisting of an obstruction, liquid pooling, changes in internal diameter of the fluidic channel, and leaks within the fluidic channel.

4. The method of claim 1, wherein the irregularity effect is selected from a pressure increase and a pressure decrease.

5. The method of claim 1, further comprising:
   comparing the error to a predetermined threshold;
   updating the estimated irregularity effect in response to the error being greater than the predetermined threshold; and
   repeating the mathematical model and comparison steps until the error is less than the predetermined threshold.

6. The method of claim 1, further comprising:
   comparing the error to a predetermined threshold;
   generating the irregularity location in response to the error being less than a predetermined threshold; and
   computing the irregularity effect based on the error within a region approximate to the irregularity location.

7. A system comprising:
   a length of fluidic channel having a fluid disposed therein;
   a device coupled with the length of fluidic channel;
   a sensor disposed within the length of fluidic channel and located at a predetermined distance from the device; and
   a non-transitory computer readable storage medium including at least one processor and communicatively coupled with each of the sensor and the device, the non-transitory computer readable storage medium storing instructions thereof executable by the at least one processor to:
      induce a pressure pulse within the fluidic channel via activation of the device, a pressure fluctuation resulting from the pressure pulse,
      detect, at the sensor, the pressure fluctuation within the fluidic channel,
      receive, at the processor, data relating to pressure fluctuation,
      determine a measured pressure profile using the data relating to the pressure fluctuation,
      receive, at the processor, an input baseline pressure profile relating pressure within an unaltered fluidic channel,
      apply an algorithm to the baseline pressure profile and the measured pressure profile,
      wherein the instructions further cause the processor to:
         receive, at the processor, an estimated irregularity effect and data relating to the pressure pulse;
         apply a mathematical model to the input data;
         determine an error based on the mathematical model; and
      output an irregularity location and an irregularity effect based on the algorithm.

8. The system of claim 7, wherein the device creates the pressure pulse by blocking the flow of the fluid through the fluidic channel.

9. The system of claim 7, wherein the irregularity is selected from the group consisting of an obstruction, liquid pooling, changes in internal diameter of the fluidic channel, and leaks within the fluidic channel.

10. The system of claim 7, wherein the irregularity effect is selected from the group consisting of a pressure increase and a pressure decrease.

11. The system of claim 7, wherein the instructions further cause the processor to:
    compare the error to a predetermined threshold;
    update the estimated irregularity effect in response to the error being greater than the predetermined threshold; and
    repeat the mathematical model and comparison steps until the error is less than the predetermined threshold.

12. The system of claim 7, further comprising:
    compare the error to a predetermined threshold;
    determine the irregularity location in response the error being less than the predetermined threshold; and
    computing the irregularity effect based on the error within a region approximate to the irregularity location.

13. A non-transitory computer-readable storage medium comprising at least one processor and having instructions stored thereon which, when executed by the at least one processor, cause the at least one processor to:
    actuate a device to induce a pressure pulse within a fluidic channel, the pressure pulse resulting in a pressure fluctuation;
    detect the pressure fluctuation within the fluidic channel at a sensor, the sensor being located at a predetermined distance from the device;
    transmit a recorded pressure fluctuation from the sensor to the at least one processor, the at least one processor communicatively coupled with each of the device and the sensor;
    determine a measured pressure profile using the pressure fluctuation data;
    receive a baseline pressure profile relating to pressure within an unaltered fluidic channel;
    apply an algorithm to the baseline pressure profile and the measured pressure profile;
    wherein the instructions further cause the processor to:
       receive an estimated irregularity effect and data relating to the pressure pulse;
       apply a mathematical model to the input data; and
       determine an error based on the mathematical model; and
    output an irregularity location and an irregularity effect based on the algorithm.

14. The non-transitory computer-readable storage medium of claim 13, wherein the algorithm is an inverse model.

15. The non-transitory computer-readable storage medium of claim 13, wherein the instructions further cause the processor to:
- compare the error to a predetermined threshold;
- update the estimated irregularity effect if the error is greater than the predetermined threshold; and
- repeat the mathematical model and comparison steps until the error is less than the predetermined threshold.

16. The non-transitory computer-readable storage medium of claim 13, wherein the instructions further cause the processor to:
- compare the error to a predetermined threshold;
- generate the irregularity location if the error is less than the predetermined threshold; and
- computing the irregularity effect based on the error within a region approximate to the irregularity location.

17. The non-transitory computer-readable storage medium of claim 13, wherein the mathematical model is a forward model.

\* \* \* \* \*